Figure 1:
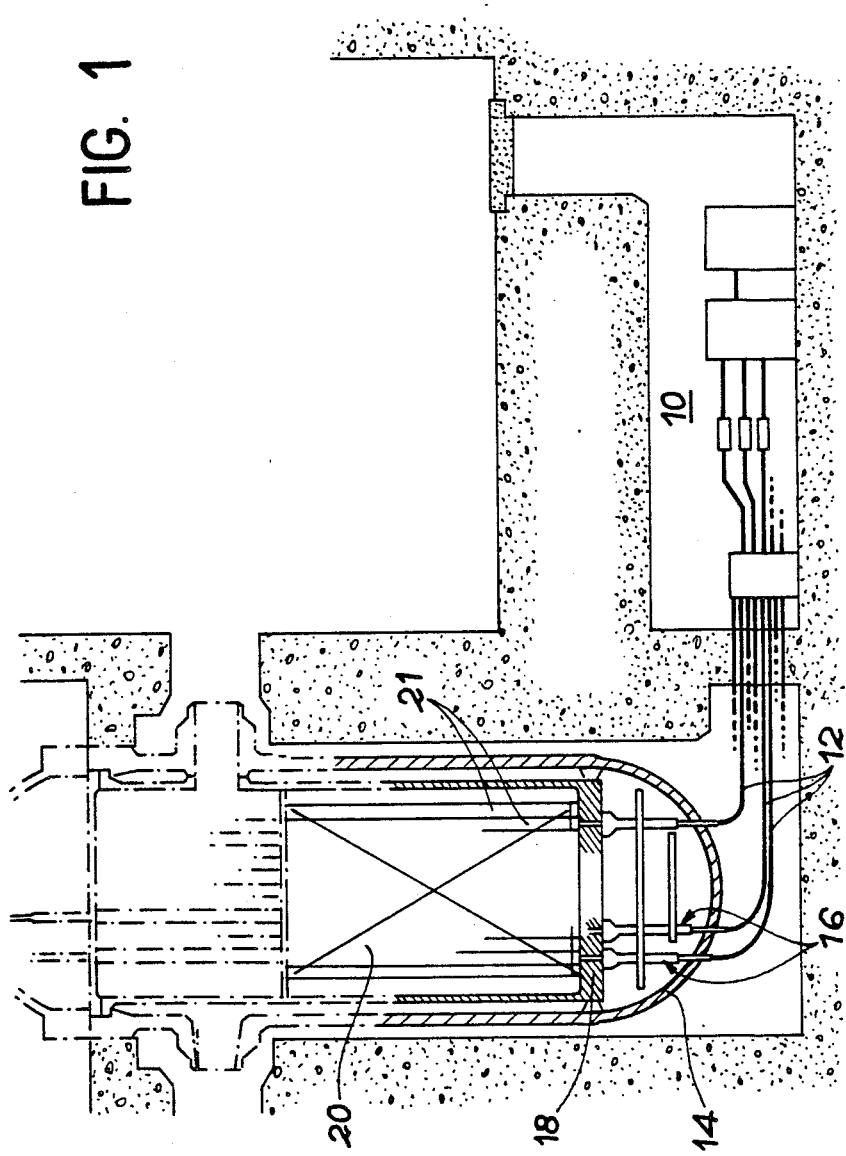

United States Patent [19]

Planchard et al.

[11] Patent Number: 4,897,239
[45] Date of Patent: Jan. 30, 1990

[54] INSTRUMENTATION COLUMN FOR THE CORE OF A PRESSURIZED WATER NUCLEAR REACTOR

[75] Inventors: Jacques Planchard, Fontenay-aux-Roses; Jean-Luc Godon, Paris, both of France; Daniel Gorman, Ottawa, Canada; Gérard Gary, Saint Cheron, France

[73] Assignee: Electricite de France Service National, Paris, France

[21] Appl. No.: 131,207

[22] Filed: Dec. 10, 1987

[30] Foreign Application Priority Data

Dec. 12, 1986 [FR] France ................. 86 17419

[51] Int. Cl.$^4$ .................... G21C 17/10; G21C 19/20
[52] U.S. Cl. ......................... 376/254; 376/352
[58] Field of Search .................. 376/254, 352, 353

[56] References Cited

U.S. PATENT DOCUMENTS

| | | |
|---|---|---|
| 4,270,979 | 6/1981 | Bevilacqua . |
| 4,584,168 | 4/1986 | Formanek .................. 376/353 |
| 4,716,004 | 12/1987 | Merkovsky et al. ........... 376/254 |
| 4,717,529 | 1/1988 | Merkovsky et al. ........... 376/254 |
| 4,778,647 | 10/1988 | Gasparro .................. 376/254 |

FOREIGN PATENT DOCUMENTS 2573236 5/1986 France .
52-17192 2/1977 Japan .

*Primary Examiner*—Charles T. Jordan
*Assistant Examiner*—Richard W. Wendtland
*Attorney, Agent, or Firm*—Pearne, Gordon, McCoy & Granger

[57] ABSTRACT

In a pressurized water nuclear reactor, the neutron flux is measured by introducing a probe into a glove finger tube, whose end is normally located in the reactor core. Each glove finger tube passes into a vertical instrumentation column, which is terminated by a nozzle (124) below one of the core assemblies. A clearance is provided around the glove finger tube in order to permit the outflow of cooling water from the core. To prevent vibration of the tubes level with nozzles (124), the latter are traversed by a passage (124a) having a constant diameter over most of its length and up to an upper planar face (124b).

2 Claims, 3 Drawing Sheets

INSTRUMENTATION COLUMN FOR THE CORE OF A PRESSURIZED WATER NUCLEAR REACTOR

DESCRIPTION

The invention relates to an instrumentation column for the core of a pressurized water nuclear reactor, said column housing a glove finger tube guiding a neutron flux measuring probe.

Pressurized water nuclear reactors are equipped with installations making it possible to periodically and remotely measure the neutron flux at certain points of the reactor core. Such an installation is shown very diagrammatically and in section in FIG. 1. It comprises an instrumentation room 10 in which work the personnel carrying out manipulations and measurements. Bent guide tubes 12 emanating from room 10 issue vertically into the hemispherical bottom of the confinement vessel 14 of the reactor.

Within the vessel and in the lower part thereof, tubes 12 are extended upwards by vertical instrumentation columns 16, which extend up to a lower horizontal plate 18 supporting the reactor core 20. More specifically and as illustrated on a larger scale in FIG. 2. each of the instrumentation columns 16 issues above plate 18 facing a guide tube 21 located in the centre of one of the nuclear fuel assemblies 21 forming core 20.

Each instrumentation column 16 successively comprises from bottom to top a vertical guide sleeve 22 fixed by its upper end to plate 18, a hole 18a which is vertically axed and has a circular section formed in plate 18 and a nozzle 24 fixed to plate 18 and projecting above the same. Nozzle 24 has a passage 24a forming a restriction, which is vertically axed and has a circular section.

In the present state of the art (FIG. 2), passage 24a formed in the nozzle is terminated at its upper end by a truncated cone-shaped enlargement, whose opening angle is 30 or 60°, as a function of the reactor type in question.

Within each guide assembly constituted by a tube 12, an instrumentation column 16 and a guide tube 20 placed a glove finger tube 33 sealed at its end located within the core. Tube 23 is a stainless steel tube of very considerable length (several meters) and small diameter (approximately 7.5 mm). It is therefore very flexible In order to facilitate the moving and replacement of fuel assemblies, this glove finger tube can be retracted to the level of plate 18. This operation is performed from the instrumentation room 10.

During the operation of the reactor, with the glove finger tubes 23 placed in core 20, a neutron flux measuring probe constituted by a miniature fission detector is periodically introduced through glove finger tubes into the reactor core. This operation, as well as the measurements corresponding thereto, are also performed from instrumentation room 10.

In order to ensure a maximum uniformity cooling of the assemblies forming the rector core 20, instrumentation columns 16 are also used for a bottom to top circulation up to the feet of assemblies 21 of the cooling water in vessel 14. For this purpose, a clearance permitting said circulation is provided between the glove finger tubes and columns 16.

In the present state of the art, the water flowing in the instrumentation columns around the glove finger tubes 23 causes vibrations of the latter level with nozzle 24. These vibrations lead to very violent impacts of the tubes against the nozzles and guide sleeves causing the wear or fracture thereof over varying periods of time (e.g. one year).

The invention therefore relates to an instrumentation column having a nozzle with a modified shape making it possible to eliminate the vibrations of the glove finger tubes for the flowrates of the water used in pressurized water reactors, whilst still having a simple manufacture.

The present invention therefore specifically relates to an instrumentation column for the core of a pressurized water nuclear reactor, which serves to house a glove finger tube ensuring the guidance of a neutron flux measuring probe, with a clearance permitting the circulation of cooling water from the core, said column successively having from bottom to top a vertical guide sleeve, whose upper end is fixed to a lower core plate, a vertical hole formed in said plate and a nozzle fixed to said plate and projecting above the same, said nozzle having a vertical passage with a circular section and whose upper end issues on to a horizontal planar face, characterized in that the passage formed in the nozzle has a constant diameter over most of its length and up to said planar horizontal face.

In an embodiment of the invention, the upper end of the nozzle has slots issuing onto the planar horizontal face and oriented substantially radially with respect to said passage.

According to a preferred embodiment of the invention, there are four such slots, which are located in two radial planes perpendicular to one another.

A description will now be given of two non-limitative embodiments with reference to the attached drawings, wherein show:

FIG. 1 Already described, a sectional view very diagrammatically showing the instrumentation installation of a pressurized water nuclear reactor.

Figure 2:
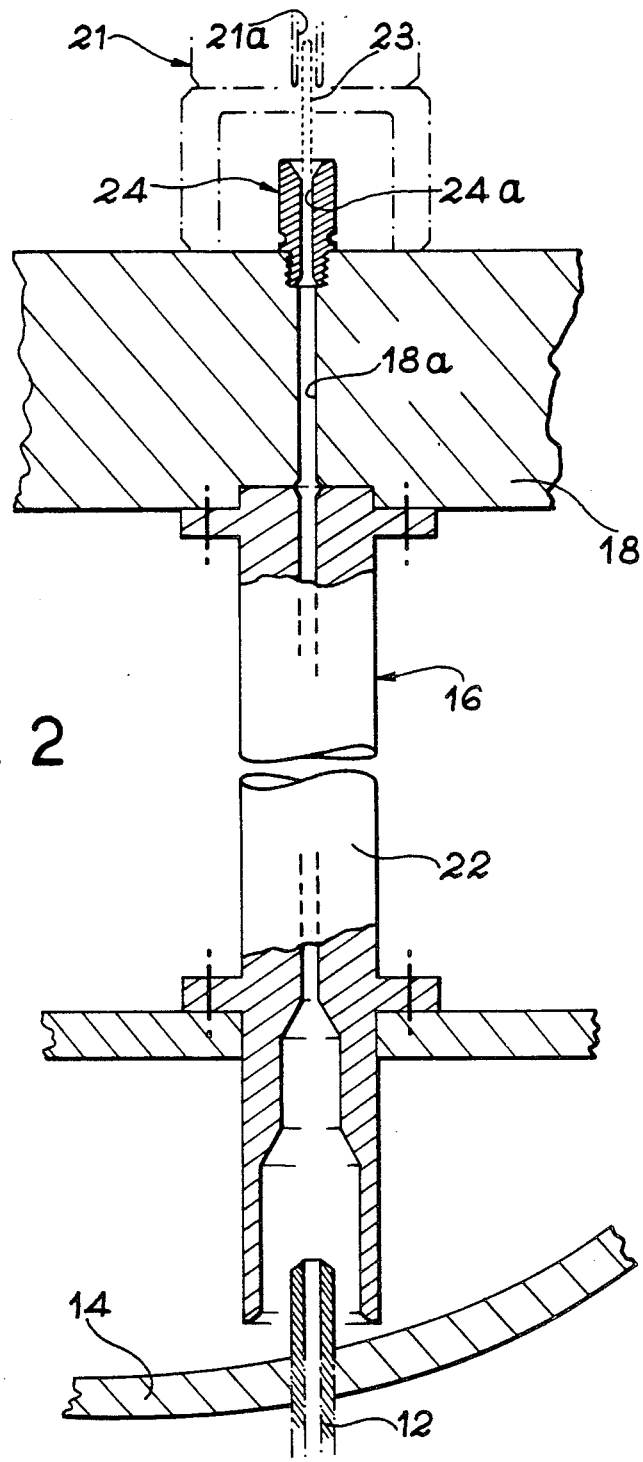

FIG. 2 Already described, a sectional view showing on a larger scale an instrumentation column having a nozzle identical to those presently used in pressurized water reactors.

Figure 3:
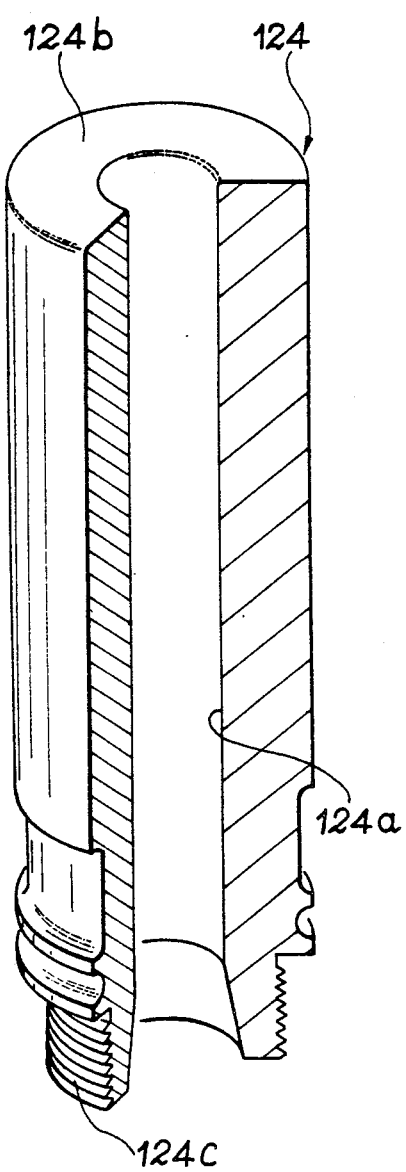

FIG. 3 An exploded perspective view showing a first embodiment of a nozzle according to the invention.

Figure 4:
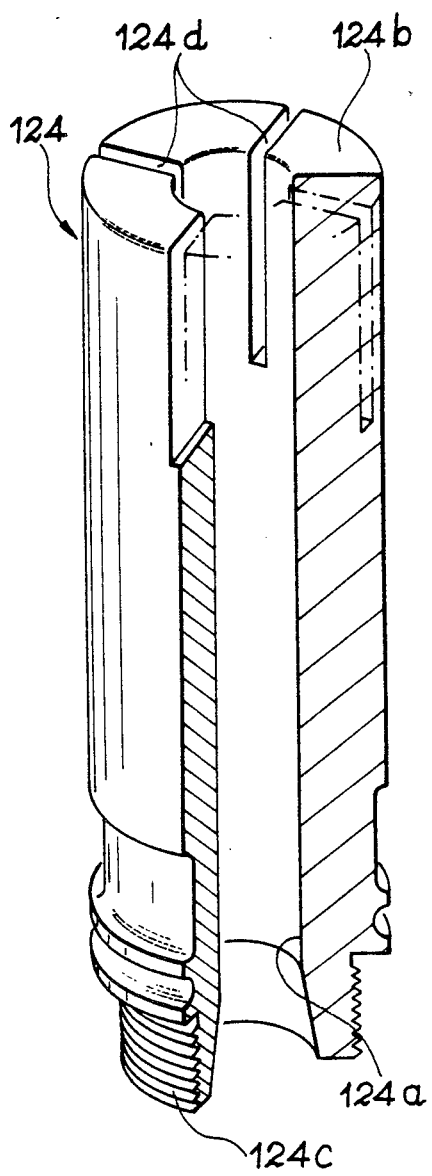

FIG. 4 A view identical to FIG. 3 illustrating a preferred embodiment of the invention.

According to the invention, the instrumentation installation is essentially formed in the same way as in existing pressurized water nuclear reactors. The main components of such an installation were described hereinbefore relative to FIG. 1.

The instrumentation column according to the invention also has a general structure identical to that of the columns used in existing reactors. In other words, It comprises from bottom to top, a vertical guide sleeve 22, a vertical hole 18a formed in the lower core plate 18 and a nozzle 124 fixed to said plate and projecting over the upper face thereof. The general structure of this instrumentation column is consequently comparable to that described hereinbefore relative to FIG. 2.

However, to obviate the problem of the glove finger tubes vibrating under the effect of the flow of reactor cooling water, nozzle 124 is inventively given a modified construction.

The modifications made to the structure of the nozzle are based on the observation that, in existing reactors, the vibrations of the glove finger tubes are caused by the turbulence of the cooling water flow occurring in the vicinity of the truncated cone-shaped enlargement formed in the upper part of the passage traversing the nozzle.

On the basis of this hypothesis and whilst bearing in mind the need to design the nozzles with maximum simplicity in order to reduce manufacturing costs, the inventors have designed and tested a new type of nozzle, whose structure will now be described relative to FIG. 3.

As in existing reactors, nozzle 124 has a revolution shape about a vertically oriented axis, when the nozzle is fixed to the lower core plate. Along said axis, it has a passage 124a with a circular section and a constant diameter over most of its length. In particular, the constant diameter portion of passage 124a issues directly on to the upper planar face 124b of the nozzle. In other words, the truncated cone-shaped enlargement formed at the upper end of the passage in the presently used nozzles is eliminated.

Nozzle 124 according to the invention otherwise has identical characteristics to those of existing nozzles. In particular, passage 124a has a smaller diameter than the hole formed in the lower core plate supporting the nozzle and the passage formed in the guide sleeve downwardly extends said hole, in such a way that passage 124a constitutes a constriction for the water circulating from bottom to top in the instrumentation column. The dimensions of the nozzle otherwise remain unchanged, as do the means for fixing the nozzle to the lower core plate.

Thus, the nozzle e.g. has a total height of approximately 100 mm and the diameter of passage 124a is approximately 13 mm. Moreover, nozzle 124 is provided at its lower end with a threaded portion 124c, which can be screwed into the lower core plate. Level with said threaded portion, passage 124a has a truncated cone-shaped inlet enlargement.

Tests performed on real size mockups produced in accordance with FIG. 3 have demonstrated the effectiveness of the proposed solution. In particular, due to the use of such nozzles, there is no significant vibration of the glove finger tubes for the flowrates of the water used in pressurized water nuclear reactors.

In the preferred embodiment of the invention illustrated in FIG. 4, this result is further improved.

The embodiment of FIG. 4 has all the characteristics described hereinbefore relative to FIG. 3. In particular, the passage 124a traversing nozzle 124 has a uniform diameter over most of its length and in particular up to the upper planar face 124b on to which it issues.

In FIG. 4, the flow of water at the outlet of the nozzle is improved as a result of slots 124d issuing on to the upper face 124b thereof. These slots 124d are oriented radially with respect to the vertical axis of symmetry of the nozzle and link passage 124a with the outer surface of the nozzle.

In the embodiment shown in FIG. 4, nozzle 124 has four slots 124d located in two planes which are perpendicular to one another and which pass through the vertical axis of the nozzle. However, a different number of slots could also be provided, said slots then being regularly distributed about the axis of symmetry of the nozzle. Slots 124d have an adequate depth to permit a better flow of water at the outlet of the lower core plate. For example, this depth corresponds to approximately 1/5 of the total length of the nozzle, i.e. they have a depth of approximately 20 mm in the case where the nozzle is approximately 100 mm long.

We claim:

1. An instrumentation column for the core of a pressurized water nuclear reactor, which serves to house a glove finger tube (23) ensuring the guidance of a neutron flux measuring probe, with a clearance permitting the circulation of cooling water from the core (20), said column (16) successively having from bottom to top a vertical guide sleeve (22), whose upper end is fixed to a lower core plate (18), a vertical hole (18a) formed in said plate and a nozzle (124) fixed to said plate and projecting above the same, said nozzle having a vertical passage (124a) with a circular section and whose upper end issues on to a horizontal planar face (124b), characterized in that the passage (124a) formed in the nozzle has a constant diameter over most of its length and up to said planar horizontal face (124b), the upper end of the nozzle having slots (124d) issuing on to the planar horizontal face (124b) and oriented substantially radially with respect to said passage (124a).

2. Instrumentation column according to claim 1, characterized in that the upper end of the nozzle has four slots (124d) located in two radial planes which are perpendicular to one another.

* * * * *